UNITED STATES PATENT OFFICE.

ALFRED H. COWLES, OF SEWAREN, NEW JERSEY, ASSIGNOR TO THE ELECTRIC SMELTING AND ALUMINUM COMPANY, OF SEWAREN, NEW JERSEY.

PROCESS OF FORMING A CHARGE MIXTURE FOR PRODUCING HYDROCHLORIC ACID AND ALKALI-SILICO-ALUMINATE.

1,040,894.  Specification of Letters Patent.  Patented Oct. 8, 1912.

No Drawing.  Application filed October 10, 1911.  Serial No. 653,876.

*To all whom it may concern:*

Be it known that I, ALFRED H. COWLES, a citizen of the United States, and a resident of Sewaren, in the county of Middlesex and State of New Jersey, have invented a certain new and useful Process of Forming Charge Mixtures for Producing Hydrochloric Acid and Alkali-Silico-Aluminate, of which the following is a specification.

The present invention relates to a process for manufacturing hydrochloric acid and alkali-silico-aluminate.

The object of the invention is to furnish a process by means of which with a furnace of given capacity, frequent runs may be made, resulting in uniform products of a high grade, thereby changing the former impracticable and uncommercial experiments into a practicable and economical commercial process.

It has long been known that water vapor will decompose alkali chlorids in the presence of alumina or silica, or both combined, at elevated temperatures. There is formed an alkali oxid which combines with the silica or alumina, or both, as the case may be, while the freed chlorin unites with the hydrogen from the water vapor, to form hydrochloric acid gas. Various attempts have been made to use this process commercially. Among others, Dr. Adolf Kayser, in British Patent No. 11,492 of 1887, proposed decomposing salt with clay and steam in the downdraft form of furnaces, and there appears a method for carrying this reaction into effect in U. S. Patent No. 375,409, of January, 1888. All these attempts have been productive of no commercial success (as can be seen from Lunge, *"Sulphuric Acid and Alkali,"* Vol. III, 3d edition, 1911, pp. 240 and 250). The cause of non-success in previous processes lay in the fact that there was incomplete conversion of the charge mixture, for the reason that the conversion took place only on the surface, and penetrated the block with too great slowness to permit success. The result was a too weak hydrochloric acid, and an unutilizable aluminate or silicate. Briquets made of salt and clay alone are not sufficiently porous to permit the reaction to work commercially and economically, as I and others have discovered.

My improved process relates to the preparation of the charge mixture, and to the treatment in the furnace of said mixture.

The essential feature of my mixture is that it shall be thoroughly porous, and this porosity may be attained in various ways.

In order to get my material into convenient condition for manipulation, I prefer to mix with the charge mass sufficient water to render the same plastic, when it can be formed into the desired shape. I may take an intimate mixture composed of say, 30% to 65% bauxite (preferably the non-ferruginous type) and 30% to 50% alkali chlorid and make it porous or spongy by one of the methods described below, and use it in the form of bricks, or shavings, or lumps of any desired shape, the essential feature of my invention being the sponginess or porosity of the mass, allowing free access of the combustion gases and of the steam and air to all parts of the mixture. Or, I may form my mixture of clay, alumina and silica (or non-ferruginous compounds of alumina and silica) together with an alkali chlorid and a substance which shall pass off or evolve a small amount of gas and render the above mixture porous, or spongy, and therefore easily accessible to the furnace gases and to the steam and air in the furnace.

There are various methods by which the porosity may be imparted to the charge mixture. One method consists in mixing with the silico-aluminous materials and the alkali chlorid some substance that on drying, or on subjection to heat shall be partially driven off as gas causing expansion, or which shall shrink on heating. Carbon may be mixed in a finely divided state with the other materials and when they are subjected to heat in the presence of air, the carbon will burn and form carbonic oxid and disappear, leaving the charge mixture spongy or porous. Another method consists of combining with the clay (alumina, silica) and alkali chlorid materials that on mixing, or heating, produce carbon dioxid throughout the mass. Thus, one may mix with the materials tartaric acid and carbonate or bicarbonate of soda. Of course care must be taken not to use any acid or material which would contaminate either the hydrochloric acid fumes produced or the material remaining as alkali-silico-aluminate.

To obtain the sponginess when material is mixed in the body of the mass, I find a good composition to be the following: clay (alumina, silica) 15% to 55%; alkali chlorid 30% to 55%, and a variable amount of volatile material, say tartaric acid and carbonate of soda, dependent upon the temperature, the make-up of the charge, and the degree of porosity desired. Gelatin or glue may be added to the mixture of silico-aluminous material and the salt, which upon addition of water expands and on heating or drying contracts to small volume, thus leaving the mass porous. Gelatinous alumina and gelatinous silica will act in the same manner, the mechanically mixed water first passing off and then the chemically combined water, when the bodies will shrink and leave the bodies porous.

The charge is subjected in the furnace to a temperature of 1700° to 2400° F. The reaction begins at a comparatively low temperature. It proceeds slowly at first, and it is only when we reach about 1700, with a mixture containing about 32 parts alumina, 46 parts silica and 70 parts salt that the reaction is rapid. With this mixture the product formed maintains up to 2000 degrees F. its original shape (brick if that was the shape) without melting. The temperature of operation depends upon the relative proportion of alumina and silica in the mixture. If alumina predominates, the temperature is higher, if silica is more abundant, the temperature at which fusion occurs is lower. Although a new crystalline structure is given the final product, the process is one that can be carried out without fusion. The charge mixture in the shape of a porous mass comprising alkali chlorid mixed with aluminous, or silico-aluminous material, is now ready to be subjected to the second step of the process. The charge mixture is fed into a furnace where it is exposed to the action of heat, while being acted upon by steam and air or steam alone forced into the furnace and through the mixture. The furnace employed may be of any suitable kind, such as a down-draft or muffle, or reverberatory, though I now prefer a furnace of the tunnel type. The steam acting alone or in conjunction with air and the combustion gases, upon the mixture, decomposes the alkali chlorid, the chlorin thereof uniting with the hydrogen and passing off to the condensing chambers in the form of hydrochloric acid fumes, the rest of the charge remaining behind under the form of alkali-silico-aluminate.

It is a well known physical fact that all bodies are to a certain extent porous, but that is not the porosity required for my process. This process calls for artificial porosity, purposely produced, and sufficient to allow the gases free access to all parts of the charge.

I do not herein claim a charge mixture composed of carbon mixed with salt and the clay materials, as that has been included and claimed in my pending application Ser. No. 637,346, filed July 7, 1911.

Having thus fully set forth my invention what I claim is:—

1. The process for producing a non-combustible charge mixture for making hydrochloric acid and alkali-silico-aluminate, which comprises forming a mixture of alkali chlorid and silico-aluminous compound and combining therewith in such proportions as to produce a non-combustible charge a body adapted to disappear, treating the mass to cause said body to disappear and leave the mass porous.

2. The process for producing a non-combustible charge mixture for making hydrochloric acid and alkali-silico-aluminate, which comprises forming a mixture of alkali chlorid and a silico-aluminous material, adding thereto in such proportions as to produce a non-combustible charge a material adapted to pass off and leave the mixture porous, and treating the mass to remove at least a part of said material.

3. The process for producing a charge mixture for making hydrochloric acid and alkali-silico-aluminate, which comprises producing shaped bodies by mixing, in such proportions as to produce a non-fuel charge, clay, salt, and a material adapted to disappear at a temperature of 1700 to 2400 degrees Fahrenheit and render the charge mixture porous and preserve its original shape as put into the furnace.

4. The process of forming a non-combustible charge mixture for making hydrochloric acid and alkali-silico-aluminate, which comprises producing shaped bodies of silico-aluminous materials and an alkali chlorid, adding thereto a material adapted to pass off and then treating the mass so formed at such temperature that the compound becomes porous, while retaining its original external shape.

Signed at Sewaren, in the county of Middlesex and State of New Jersey, this 4th day of Oct. A. D. 1911.

ALFRED H. COWLES.

Witnesses:
 FRANK NEER,
 ALBERT STETSON.